(12) United States Patent
Yamane et al.

(10) Patent No.: US 9,803,581 B2
(45) Date of Patent: Oct. 31, 2017

(54) EXHAUST GAS PURIFYING APPARATUS

(71) Applicant: Yanmar Co., Ltd., Osaka-shi, Osaka (JP)

(72) Inventors: Hironori Yamane, Osaka (JP); Masahiro Koura, Osaka (JP); Hiroshi Sueto, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 589 days.

(21) Appl. No.: 14/328,087

(22) Filed: Jul. 10, 2014

(65) Prior Publication Data

US 2015/0017070 A1    Jan. 15, 2015

(30) Foreign Application Priority Data

Jul. 11, 2013 (JP) ................. 2013-145768

(51) Int. Cl.
*F01N 3/00* (2006.01)
*F02D 41/40* (2006.01)
(Continued)

(52) U.S. Cl.
CPC ...... *F02D 41/405* (2013.01); *F01N 2430/085* (2013.01); *F01N 2560/06* (2013.01); *F01N 2560/08* (2013.01); *F01N 2560/14* (2013.01); *F01N 2900/12* (2013.01); *F01N 2900/1602* (2013.01); *F02D 41/025* (2013.01);
(Continued)

(58) Field of Classification Search
USPC .......... 60/278, 280, 285, 286, 295, 299, 303
See application file for complete search history.

(56) References Cited

U.S. PATENT DOCUMENTS 6,145,303 A    11/2000  Strehlau et al.
6,901,747 B2 *  6/2005  Tashiro ................... F01N 3/035
                                             123/299
(Continued)

FOREIGN PATENT DOCUMENTS

EP    0 945 608 A2    9/1999
EP    1 978 219 A1   10/2008
(Continued)

OTHER PUBLICATIONS

Japanese Office Action issued in counterpart Japanese Application No. 2013-145768 dated Dec. 20, 2016 (three pages).
(Continued)

*Primary Examiner* — Binh Q Tran
(74) *Attorney, Agent, or Firm* — Crowell & Moring LLP

(57) ABSTRACT

Provided is an exhaust gas purifying apparatus capable of making a filter entrance temperature reach a target temperature while suppressing excessive temperature increases and release of THC even upon extension of the exhaust path or decreases in outside air temperature. The exhaust gas purifying apparatus includes an oxidation catalyst 18 and a filter 19 that are placed in an exhaust path 5 of an engine 1, a fuel injection device 13 for injecting fuel in accordance with a fuel injection pattern, and a control device 50 configured to be capable of setting the fuel injection pattern including post-injection, wherein an upper-limit value of post-injection quantity increases with decreasing outside air temperature and/or with elongating path length of the exhaust path 5.

6 Claims, 9 Drawing Sheets

(51) Int. Cl.
*F02D 41/02* (2006.01)
*F02D 41/14* (2006.01)

(52) U.S. Cl.
CPC ........ *F02D 41/029* (2013.01); *F02D 41/1446* (2013.01); *F02D 41/1448* (2013.01); *F02D 2041/1422* (2013.01); *F02D 2041/1432* (2013.01); *F02D 2200/0414* (2013.01); *F02D 2200/70* (2013.01); *Y02T 10/44* (2013.01)

(56) References Cited

U.S. PATENT DOCUMENTS

| | | | | |
|---|---|---|---|---|
| 7,594,390 | B2* | 9/2009 | Kitahara | F01N 13/009 123/299 |
| 8,443,589 | B2* | 5/2013 | He | F01N 3/035 60/274 |
| 8,474,247 | B2* | 7/2013 | Gomez, III | F02D 41/029 60/286 |
| 2007/0068148 | A1* | 3/2007 | Kurata | F01N 3/0231 60/297 |
| 2010/0236222 | A1 | 9/2010 | Gomez, III | |

FOREIGN PATENT DOCUMENTS

| | | |
|---|---|---|
| EP | 2 184 469 A2 | 5/2010 |
| EP | 2 184 469 A3 | 5/2010 |
| JP | 2006-316743 A | 11/2006 |
| JP | 2008-150966 A | 7/2008 |
| JP | 2011-153617 A | 8/2011 |
| JP | 2012-87687 A | 5/2012 |

OTHER PUBLICATIONS

European Search Report dated Dec. 16, 2014 (six pages).
European Search Report dated May 19, 2015 (Thirteen (13) pages).
Kandylas, et al. "Engine exhaust system design based on heat transfer computation", Energy Conversion & Management 40 (1999), pp. 1057-1072, XP004162444, (Sixteen (16) pages).

* cited by examiner

Fig. 4

| Control Mode | State of Apparatus | | | | | Regeneration Type | Target Temperature | Regeneration Trigger (Start) | Work Possibility |
|---|---|---|---|---|---|---|---|---|---|
| | EGR | Intake Throttling | Main Injection Timing | After Injection | Post-Injection | | | | |
| Self-Regeneration | Usable | Nonuse | Normal | Nonuse | Nonuse | NO$_2$ Regeneration (Low-Temperature Regeneration) | — | Automatic | Work Permitted (Rotation Speed Changeable) |
| Assist Regeneration | Nonuse | Use | Retarded | Use | Nonuse | | Assist Target Temperature (Catalyst Entrance Temperature) | Automatic | Work Permitted (Rotation Speed Changeable) |
| Reset Regeneration | Nonuse | Use | Retarded | Use | Use | O$_2$ Regeneration (High-Temperature Regeneration) | Reset Target Temperature (Filter Entrance Temperature) | Automatic | Work Permitted (Rotation Speed Changeable) |
| Stationary Standby | | | | | | | | | |
| Stationary Regeneration | Nonuse | Use | Retarded | Use | Use | | Stationary Target Temperature (Filter Entrance Temperature) | Manual | Work Prohibited (Specified Rotation Speed Maintained) |
| Maintenance Standby | | | | | | | | | |

EXHAUST GAS PURIFYING APPARATUS

Priority is claimed on Japanese application No. 2013-145768, filed Jul. 11, 2013, the content of which is incorporated herein by reference.

TECHNICAL FIELD

The present invention relates to an exhaust gas purifying apparatus including oxidation catalyst and a filter that are placed in an exhaust path of an engine, a fuel injection device for injecting fuel in accordance with a fuel injection pattern, and a control device that is configured to be capable of setting up the fuel injection pattern including post-injection.

BACKGROUND ART

Conventionally, diesel particulate filters having oxidation catalyst and filters have been known. Patent Literature 1 discloses an example of an exhaust gas purifying apparatus including such a diesel particulate filter.

The exhaust gas purifying apparatus of Patent Literature 1 carries out post-injection in order to increase temperature of exhaust gas in regeneration of the filter. When the post-injection is performed, fuel is supplied into an exhaust path and oxidation catalyst brings about combustion of the fuel. Then the temperature of the exhaust gas is increased upstream of the filter and the filter is heated by the exhaust gas with the increased temperature. As a result, the filter is regenerated by combustion of particulate matter trapped by the filter. In the exhaust gas purifying apparatus of Patent Literature 1, post-injection quantity is corrected so that temperature of the filter reaches a target temperature. That is, the post-injection quantity is controlled by feedback control in order that the temperature of the filter is increased to and kept at the target temperature.

CITATION LIST

Patent Literature

PTL1: JP 2012-87687 A

SUMMARY OF INVENTION

Technical Problem

For control over the post-injection quantity, setting of an upper-limit value for the post-injection quantity has been examined in order to suppress excessive temperature increases, release of total hydrocarbon (THC), and the like. The upper-limit value is determined on a basis of data experimentally obtained from operation of a specific engine under a specific outside air temperature, for instance.

Upon extension of the exhaust path due to change in specifications of an engine, great decrease in the outside air temperature due to usage environment of the engine, on the other hand, quantity of heat radiated from the exhaust path is increased. Increase in the quantity of radiated heat makes it necessary to increase the post-injection quantity itself in order that the temperature of the filter is increased to and kept at the target temperature. The upper-limit value of the post-injection quantity, however, is defined on the basis of the exhaust path with a specific path length and the specific outside air temperature. Accordingly, there is a possibility that the temperature of the filter does not reach the target temperature because the increase in the post-injection quantity is restricted by the upper-limit value. Without the setting of the upper-limit value, on the other hand, the excessive temperature increase, the release of THC, and/or the like may be brought about.

It is an object of the invention to provide an exhaust gas purifying apparatus that is capable of making a filter entrance temperature reach a target temperature while suppressing excessive temperature increases, release of THC, and the like even upon extension of the exhaust path, decreases in outside air temperature or the like.

Solution to Problem

In order to accomplish the above object, there is provided, an exhaust gas purifying apparatus comprising:

an oxidation catalyst and a filter that are placed in an exhaust path of an engine;

a fuel injection device for injecting fuel in accordance with a fuel injection pattern of fuel injection including post-injection; and a control device configured to be capable of setting the fuel injection pattern, wherein an upper-limit value of post-injection quantity for the post-injection increases with decreasing outside air temperature and/or with elongating path length of the exhaust path.

In one embodiment, on condition that the outside air temperature is lower than a specified outside air temperature and/or that the path length is longer than a specified path length, the post-injection quantity is gradually changed by filter processing.

In one embodiment, the exhaust gas purifying apparatus further comprises:

a filter entrance temperature sensor for detecting a filter entrance temperature that is a temperature of exhaust gas which exists between the oxidation catalyst and the filter or a catalyst entrance temperature sensor for detecting a catalyst entrance temperature that is a temperature of the exhaust gas which exists at an entrance of the oxidation catalyst; and an initial exhaust temperature sensor for detecting an initial exhaust temperature that is a temperature of the exhaust gas which exists at an entrance of the exhaust path, wherein the control device estimates the path length on a basis of a temperature difference between the initial exhaust temperature and the filter entrance temperature or on a basis of a temperature difference between the initial exhaust temperature and the catalyst entrance temperature.

In one embodiment, the exhaust gas purifying apparatus further comprises:

an filter entrance pressure sensor for detecting a filter entrance pressure that is a pressure of the exhaust gas which exists between the oxidation catalyst and the filter; and an initial exhaust pressure sensor for detecting an initial exhaust pressure that is a pressure of the exhaust gas which exists at the entrance of the exhaust path, wherein the control device estimates the path length on a basis of a pressure difference between the initial exhaust pressure and the filter entrance pressure.

In one embodiment, the exhaust gas purifying apparatus further comprises:

a catalyst entrance pressure sensor for detecting a catalyst entrance pressure that is a pressure of the exhaust gas which exists at the entrance of the oxidation catalyst; and an initial exhaust pressure sensor for detecting an initial exhaust pressure that is a pressure of the exhaust gas which exists at the entrance of the exhaust path, wherein the control device estimates the path length on a basis of a pressure difference between the initial exhaust pressure and the catalyst entrance pressure.

Advantageous Effects of Invention

The exhaust gas purifying apparatus according to the present invention is capable of making the filter entrance temperature reach a target temperature while suppressing excessive temperature increases and release of THC even upon extension of the exhaust path or decreases in outside air temperature.

BRIEF DESCRIPTION OF DRAWINGS

The present invention will become more fully understood from the detailed description given hereinbelow and the accompanying drawings which are given by way of illustration only, and thus are not intended to limit the present invention, and wherein:

FIG. 4 is a representation showing a list of control modes;

DESCRIPTION OF EMBODIMENTS

With reference to the accompanying drawings, a diesel engine 1 equipped with an exhaust gas purifying apparatus according to an embodiment will be described. The diesel engine (which will be referred to as engine, hereinbelow) 1 is connected to a driving mechanism 100. The driving mechanism 100 represents traveling devices and/or working devices that are driven by the engine 1. The engine 1 and the driving mechanism 100 are installed in a working vehicle such as a backhoe and a tractor.

Figure 1:
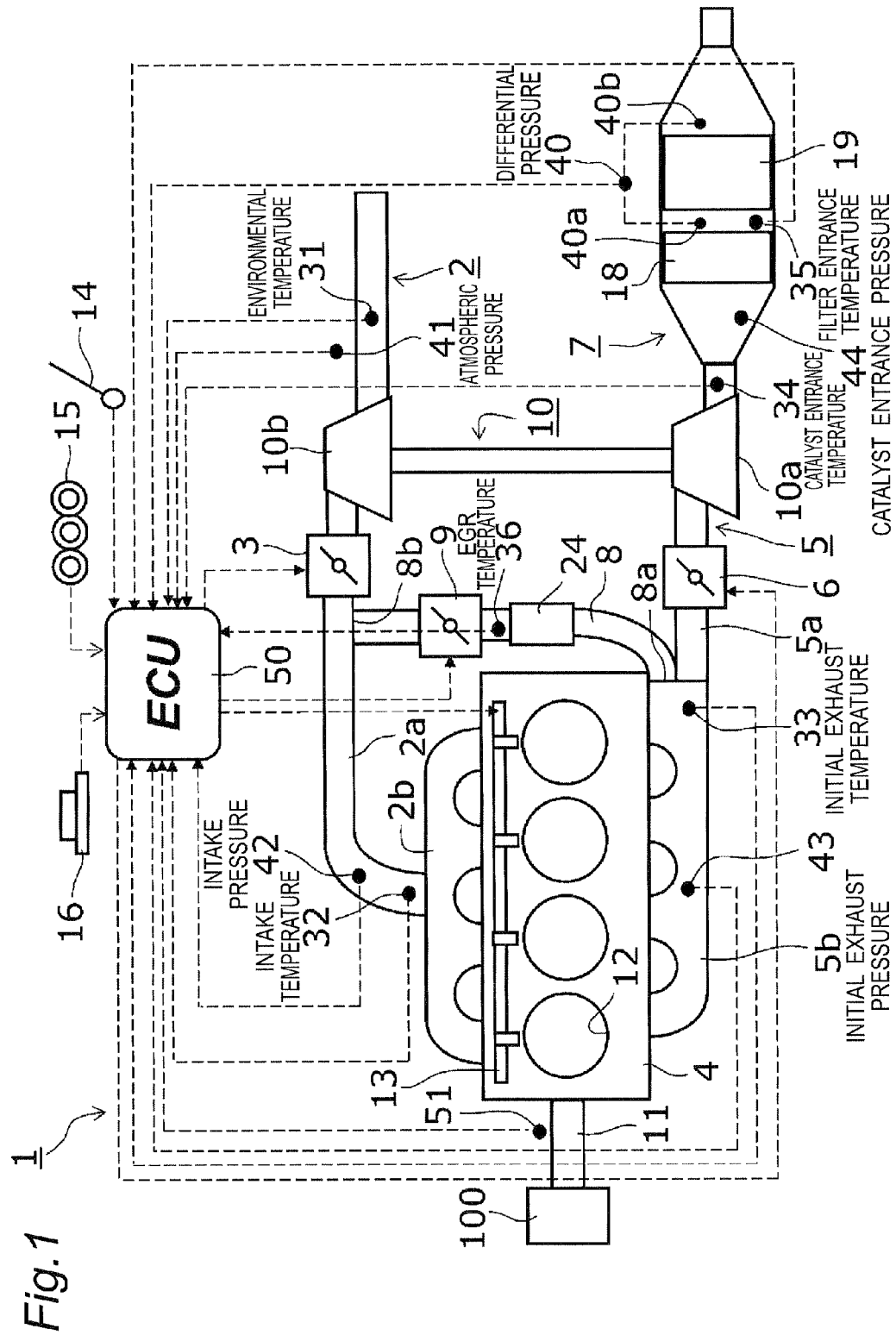
FIG. 1 is a diagram showing a configuration of an engine according to an embodiment.

FIG. 1 is a diagram showing a configuration of the engine 1 according to the embodiment. The engine 1 includes an intake path 2, an intake throttle valve 3, a cylinder block 4, an exhaust path 5, an exhaust throttle valve 6, a filter unit 7, an EGR pipe 8, an EGR throttle valve 9, a supercharger 10, a crankshaft 11, and a fuel injection device 13.

The engine 1 has four cylinders and the cylinder block 4 has four combustion chambers 12. The intake path 2 is formed of an intake pipe 2a that is opened to outside and an intake manifold 2b that connects the intake pipe 2a to the four combustion chambers 12. Outside air (intake gas) is introduced through the intake path 2 into the combustion chambers 12. The intake throttle valve 3 is placed on the intake pipe 2a and changes opening of the intake path 2. The exhaust path 5 is formed of an exhaust pipe 5a that is opened to the outside and an exhaust manifold 5b that connects the four combustion chambers 12 to the exhaust pipe 5a. Exhaust gas is discharged from the combustion chambers 12 through the exhaust path 5 to atmosphere. The exhaust throttle valve 6 is placed on the exhaust pipe 5a and changes opening of the exhaust path 5. The EGR pipe (EGR path) 8 connects the exhaust path 5 to the intake path 2. A portion of the exhaust gas is introduced through the EGR pipe 8 into the intake path 2 and is merged into the intake gas. The EGR throttle valve 6 is provided on the EGR pipe 8 and changes opening of the EGR pipe 8. An EGR cooler 24 (FIG. 3) that will be described later is provided on the EGR pipe 8 downstream of the EGR throttle valve 9. The supercharger 10 includes an exhaust turbine 10a placed on the exhaust pipe 5a and a compressor 10b placed on the intake pipe 2a. The fuel injection device 13, for which common rail system is employed, supplies fuel into the combustion chambers 12 in accordance with a fuel injection pattern.

The filter unit 7 is provided on the exhaust path 5. The filter unit 7 is a diesel particulate filter and includes oxidation catalyst 18 and a filter 19. The oxidation catalyst 18 is placed in the exhaust path 5 upstream of the filter 19. When the exhaust gas is discharged along the exhaust path 5, the exhaust gas passes through the oxidation catalyst 18 and thereafter passes through the filter 19. Particulate Matter (PM) contained in the exhaust gas is trapped by the filter 19.

An ECU (control unit) 50 is configured to control devices relating to operation of the engine 1.

A rotation speed input device 14 is operation equipment with which a target rotation speed is specified. In the embodiment, the rotation speed input device 14 is composed of a group of accelerator levers that change operating conditions of the engine 1.

A warning device 15 gives various warnings to an operator. In the embodiment, the warning device 15 is composed of a large number of lamps capable of displaying a plurality of different warnings.

A stationary regeneration button 16 is an input device that generates a command (stationary regeneration mode command) for changing the control mode to the stationary regeneration mode with a manual input operation. The stationary regeneration button 16 is a push button by which a state of "presence" of the command or a state of "absence" of the command may be specified. Contents of control modes will be described later.

In FIG. 1, the engine 1 includes an environmental temperature sensor 31, an intake temperature sensor 32, an initial exhaust temperature sensor 33, a catalyst entrance temperature sensor 34, a filter entrance temperature sensor 35, and an EGR temperature sensor 36. The environmental temperature sensor 31 detects a temperature of intake gas (environmental temperature) in the intake path 2 upstream of the compressor 10b and an outlet 8b of the EGR pipe 8. The intake temperature sensor 32 detects a temperature of the intake gas (intake temperature) in the intake path 2 downstream of the compressor 10b and the outlet 8b of the EGR pipe 8. The initial exhaust temperature sensor 33 detects a temperature of the exhaust gas (initial exhaust temperature) in the exhaust path 5 upstream of the exhaust throttle valve 6, the exhaust turbine 10a, and an inlet 8a of the EGR pipe 8. The catalyst entrance temperature sensor 34 detects a temperature of the exhaust gas (catalyst entrance temperature) in the exhaust path 5 downstream of the exhaust throttle valve 6 and the exhaust turbine 10a and upstream of the oxidation catalyst 18. The filter entrance temperature sensor 35 detects a temperature of the exhaust gas (filter entrance temperature) in the exhaust path 5 downstream of the oxidation catalyst 18 and upstream of the filter 19. The EGR temperature sensor 36 detects a temperature of the exhaust gas (EGR temperature) in the EGR pipe 8 downstream of the EGR cooler 24 and upstream of the EGR throttle valve 9.

In FIG. 1, the engine 1 includes a differential pressure sensor 40, an atmospheric pressure sensor 41, an intake pressure sensor 42, an initial exhaust pressure sensor 43, and a catalyst entrance pressure sensor 44. The differential pressure sensor 40 includes a filter entrance pressure sensor 40a and a filter exit pressure sensor 40b. The filter entrance pressure sensor 40a detects a pressure in the exhaust path 5 downstream of the oxidation catalyst 18 and upstream of the filter 19. The filter exit pressure sensor 40b detects a pressure in the exhaust path 5 downstream of the filter 19. The differential pressure sensor 40 detects differential pressure between both sides of the filter 19 on a basis of information detected by the filter entrance pressure sensor 40a and the filter exit pressure sensor 40b. The atmospheric pressure sensor 41 detects pressure (atmospheric pressure) outside the engine 1. The intake pressure sensor 42 detects pressure of the intake gas (intake pressure) in the intake path 2 downstream of the compressor 10b and the outlet 8b of the EGR pipe 8. The initial exhaust pressure sensor 43 detects a pressure of the exhaust gas (initial exhaust pressure) in the exhaust path 5 upstream of the exhaust throttle valve 6, the exhaust turbine 10a, and the inlet 8a of the EGR pipe 8. The catalyst entrance pressure sensor 44 detects a pressure of the exhaust gas (catalyst entrance pressure) in the exhaust path 5 downstream of the exhaust turbine 10a and upstream of the oxidation catalyst 18.

In FIG. 1, the engine 1 includes a rotation speed sensor 51. The rotation speed sensor 51 detects rotation speed (engine rotation speed) of the crankshaft 11.

Figure 2:
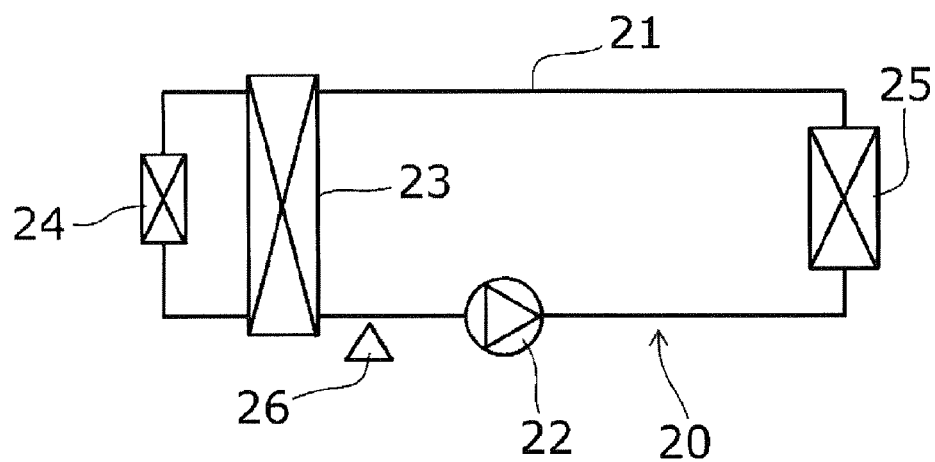
FIG. 2 is a diagram showing a configuration of a cooling water circuit of the engine.

FIG. 2 is a diagram showing a configuration of a cooling water circuit 20 of the engine 1. The cooling water circuit 20 includes a water path 21, a water pump 22, a water jacket 23, an EGR cooler 24, and a radiator 25. The water pump 22 makes cooling water in the engine 1 flow along the water path 21. The water jacket 23 is formed in the cylinder block 4. The engine 1 includes a water temperature sensor 26. The water temperature sensor 26 detects temperature (cooling water temperature) of the cooling water, flowing through the water path 21, downstream of the water jacket 23 and upstream of the radiator 25.

A method of estimating deposition amount will be described. Herein, the deposition amount designates amount of PM deposited on the filter 19. The ECU 50 is capable of estimating the deposition amount on the basis of two estimation methods. The two estimation methods are calculating estimation method and differential pressure estimation method.

In the calculating estimation method, the deposition amount is estimated based on operating conditions of the engine. In the calculating estimation method, PM emission amount and PM regeneration amount are estimated based on the operating conditions of the engine, and the deposition amount is estimated based on the PM emission amount and the PM regeneration amount that are thus obtained. The PM emission amount indicates amount of PM emitted from the engine 1 per unit time. The PM regeneration amount indicates amount of PM eliminated from the filter 19 by regeneration per unit time. The deposition amount is obtained by subtraction of the PM regeneration amount from the PM emission amount. Both the PM emission amount and the PM regeneration amount are estimated based on the operating conditions of the engine. The PM emission amount is basically estimated based on the rotation speed of the engine and total injection quantity per one cycle. The PM regeneration amount is estimated based on flow rate of the exhaust gas and the filter entrance temperature detected by the filter entrance temperature sensor 35. The operating conditions of the engine are determined on the basis of the temperatures detected by the temperature sensors 31 through 36, the pressures detected by the pressure sensors 41 through 45, the rotation speed of the engine detected by the rotation speed sensor 51, and the total injection quantity injected from the fuel injection device 13.

In the differential pressure estimation method, the deposition amount is estimated based on the differential pressure between both the sides of the filter 19. With increase in the deposition amount, clogging on the filter 19 and the differential pressure across the filter 19 are increased. With decrease in the deposition amount, contrarily, the differential pressure across the filter 19 is decreased. In the differential pressure estimation method, namely, the deposition amount is estimated with use of a correlation between the differential pressure and the deposition amount. Strictly, the deposition amount is obtained by application of correction based on the flow rate of the exhaust gas to the differential pressure obtained by the differential pressure sensor 40. The flow rate of the exhaust gas is estimated based on the operating conditions of the engine.

The regeneration of the filter 19 will be described with reference to FIGS. 3 through 7. Values of various temperatures (° C.) and of various deposition amounts (g/L) that will be enumerated below are merely examples used in the embodiment. Unit of the deposition amount mentioned as g/L represents weight of PM per unit volume.

The regeneration of the filter 19 is carried out by combustion of PM through agency of oxygen and oxidation of PM by nitrogen dioxide. The PM deposited on the filter 19 is eliminated by the combustion or the oxidation. The combustion of PM through agency of oxygen means the combustion of the PM with self-ignition. The self-ignition occurs on condition that temperature of PM exceeds combustion temperature (400° C.) of the PM. The nitrogen dioxide functions as an oxidant for the PM. On condition that the temperature of the oxidation catalyst 18 exceeds a fixed activation temperature (300° C.), the oxidation catalyst 18 is activated and highly active nitrogen dioxide is thereby produced from nitrogen oxide in the exhaust gas. The filter 19 is provided downstream of the oxidation catalyst 18 and thus the nitrogen dioxide produced in vicinity of the oxidation catalyst 18 passes through the filter 19. As a result, the PM deposited on the filter 19 is oxidized and eliminated. On condition that the catalyst entrance temperature is equal to or higher than a high temperature (550° C.), no nitrogen dioxide is produced and the regeneration is carried out only by the combustion through agency of oxygen.

On condition that the catalyst entrance temperature is lower than the activation temperature, neither the oxidation by nitrogen dioxide nor the combustion through agency of oxygen is brought about. Then the engine 1 makes use of change in exhaust throttling and the fuel injection pattern in order to increase the catalyst entrance temperature.

Figure 3:
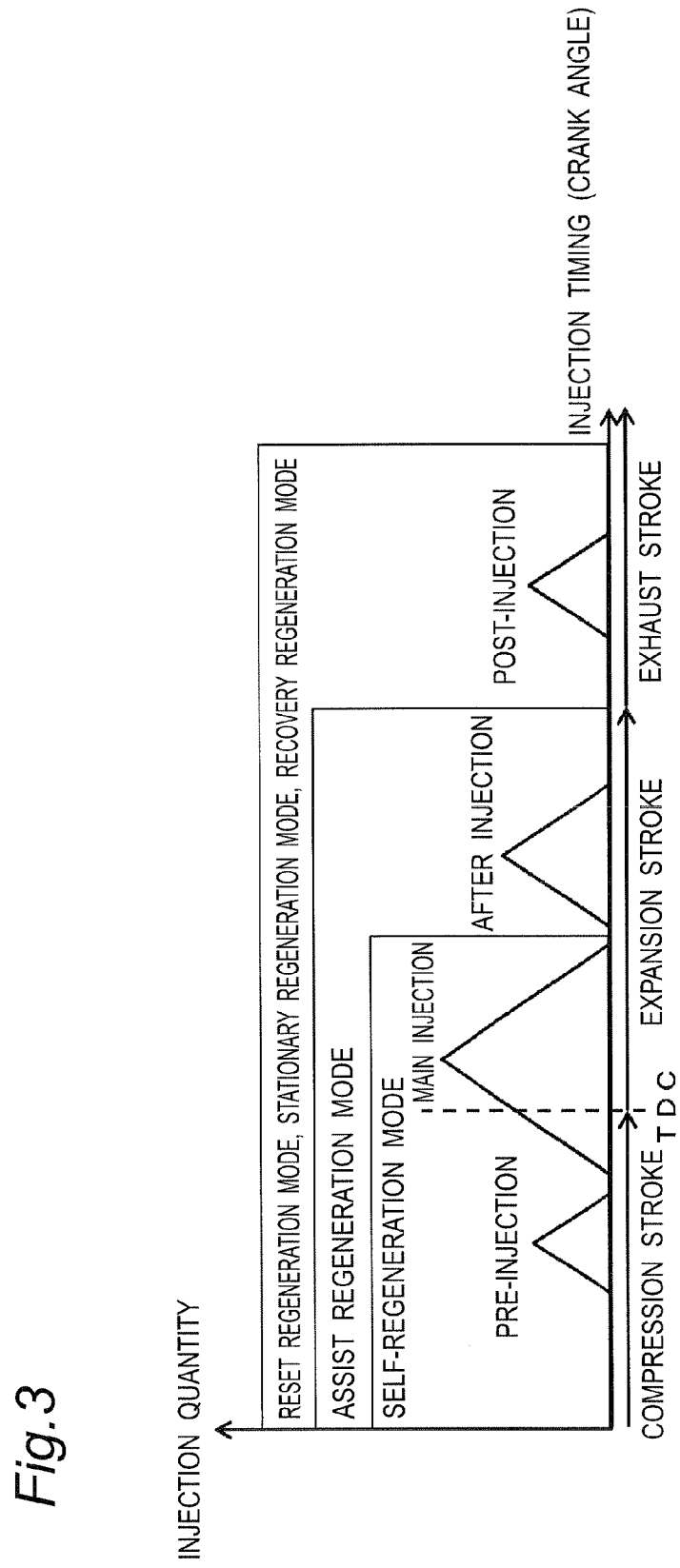
FIG. 3 is a diagram showing an example of a fuel injection pattern.

FIG. 3 is a diagram showing an example of the fuel injection pattern. In FIG. 3, horizontal axis designates injection timing and vertical axis designates injection quantity. The fuel injection pattern represents a mode of fuel injection that is specified by the injection timing and the injection quantity. The fuel injection pattern shown in FIG. 3 includes pre-injection, main injection, after injection, and post-injection. Injection period for the main injection includes Top Dead Center (TDC). The pre-injection is carried out in order to ensure an ignition quality. The main injection is carried out for main combustion. The after injection is carried out in order to increase the catalyst entrance temperature. The post-injection is carried out in order to increase the filter entrance temperature.

With the intake throttle valve 3 performing intake throttling, a load on the engine 1 is increased and injection quantity (main injection quantity) of the fuel is thereby increased. This results in an increase in the catalyst entrance temperature. The total injection quantity of the fuel can be increased without increase in torque by a change in the fuel injection pattern that is attained by the fuel injection device 13. Specifically, retarding of the main injection and/or use of the after injection are carried out. This results in an increase in the filter entrance temperature. The total injection quantity of the fuel is further increased by setting of the fuel injection pattern further including the post-injection. In this case, the fuel supplied in the post-injection undergoes combustion through agency of the oxidation catalyst 18, so that the filter entrance temperature greatly increases relative to the catalyst entrance temperature.

FIG. 4 is a representation showing a list of the control modes. The engine 1 has six possible control modes. The six control modes are composed of self-regeneration mode, assist regeneration mode, reset regeneration mode, stationary standby mode, the stationary regeneration mode, and maintenance standby mode. When the engine 1 has been started, any one of the six control modes has been chosen and the ECU 50 controls the engine 1 on a basis of the chosen control mode. For each of the control modes, control conditions, start conditions, and termination conditions are set up. The control conditions are made up of configuration of the fuel injection pattern, throttle amount for the intake throttling, and configuration of the target rotation speed. The configuration of the fuel injection pattern designates presence or absence of the pre-injection, the main injection, the after injection, and the post-injection, and the injection quantities and the injection timing of the injections. The configuration of the target rotation speed designates presence or absence and magnitude of the target rotation speed.

The self-regeneration mode is a control mode in which no special control for regenerating the filter 19 is performed. In the self-regeneration mode, normal operation is carried out. As shown in FIG. 3, the fuel injection pattern in the self-regeneration mode is composed of the pre-injection and the main injection. When the catalyst entrance temperature exceeds the activation temperature in the normal operation (self-regeneration mode), the regeneration of the filter 19 is automatically carried out.

The assist regeneration mode is a control mode for regenerating the filter 19 without using the post-injection. In the assist regeneration mode, the fuel injection pattern is set up and the intake throttling is used so as to increase the catalyst entrance temperature. As shown in FIG. 3, the fuel injection pattern in the assist regeneration mode is composed of the pre-injection, the main injection, and the after injection. The injection timing for the main injection in the assist regeneration mode is retarded relative to the injection timing for the main injection in the self-regeneration mode. The retardation of the injection timing of the main injection and the use of the after injection decrease ratio of fuel quantity contributing to torque generation and increase ratio of fuel quantity contributing to temperature increase. The intake throttling increases the load on the engine 1 and therefore increases the main injection quantity. As shown in FIG. 3, the main injection is carried out in compression strokes and expansion strokes. That is, the total injection quantity in the compression strokes and the expansion strokes is increased in the assist regeneration mode. This results in an increase in the catalyst entrance temperature.

The assist regeneration mode aims to make the catalyst entrance temperature reach an assist target temperature (350° C.) that is higher than the activation temperature and lower than the combustion temperature. Once the catalyst entrance temperature reaches the activation temperature, the regeneration of the filter 19 is moderately carried out. In the assist regeneration mode, however, performance of work is permitted and fluctuation in the rotation speed is therefore expected. The fluctuation in the rotation speed causes fluctuation in the main injection quantity and in the catalyst entrance temperature. On condition that the rotation speed is kept low, accordingly, the catalyst entrance temperature may fail to reach the assist target temperature.

The reset regeneration mode is a control mode for quickly regenerating the filter 19 with use of the post-injection. In the reset regeneration mode, the fuel injection pattern is set up and the intake throttling is used so as to increase the filter entrance temperature. As shown in FIG. 3, the fuel injection pattern in the reset regeneration mode is composed of the pre-injection, the main injection, the after injection, and the post-injection. That is, the control conditions in the reset regeneration mode include use of the post-injection in addition to the control conditions in the assist regeneration mode. When the post-injection is performed on condition that the catalyst entrance temperature exceeds the activation temperature, the fuel is combusted through agency of the oxidation catalyst 18. As a result, the exhaust gas is further heated and the filter entrance temperature is further increased.

The reset regeneration mode aims to make the filter entrance temperature reach a reset target temperature (600° C.) that is higher than the combustion temperature so that the deposition amount generally reaches zero. Once the filter entrance temperature reaches the reset target temperature (600° C.), the regeneration of the filter 19 is carried out in a comparatively short period of time. In the reset regeneration mode also, however, the performance of work is permitted and fluctuation in the rotation speed is therefore expected. On condition that the rotation speed is kept low, accordingly, the filter entrance temperature may fail to reach the reset target temperature.

In the self-regeneration mode, the assist regeneration mode, and the reset regeneration mode, the rotation speed is not fixed as described above and thus the catalyst entrance temperature or the filter entrance temperature may fail to increase satisfactorily. In such a case, the regeneration of the filter 19 is not satisfactorily carried out. Therefore, the stationary regeneration mode is created so that the regeneration of the filter 19 is reliably carried out.

The stationary regeneration mode is a control mode for quickly regenerating the filter 19 with maintenance of the rotation speed at the specified rotation speed and with use of the post-injection. In the stationary regeneration mode, the setting of the fuel injection pattern, the use of the intake throttling, and the maintenance of the target rotation speed at the specified rotation speed are carried out so that the filter entrance temperature is increased. In the stationary regeneration mode, namely, the control in the reset regeneration mode is executed and the rotation speed is additionally fixed. In the embodiment, the specified rotation speed is 2200 rpm. The control conditions in the stationary regeneration mode are set up so that the filter entrance temperature reaches a stationary target temperature (600° C.) that is higher than the combustion temperature (400° C.). In the embodiment, the stationary target temperature is equal to the reset target temperature.

With increase in the filter entrance temperature, rate of decrease in the deposition amount increases. In case where the filter entrance temperature becomes too high, however, a fear is caused that the filter 19 may be melted or cracked. Therefore, level of the stationary target temperature (600° C.) is set up so that execution time of the stationary regeneration mode lasts for a specified short period H5a (30 minutes). Similarly, level of the reset target temperature is set up so that execution time of the reset regeneration mode lasts for a specified short period H3a (30 minutes).

The stationary standby mode is a control mode for awaiting execution of the stationary regeneration mode. In case where the regeneration of the filter 19 is not satisfactorily carried out in the self-regeneration mode, the assist regeneration mode, and the reset regeneration mode, it is necessary to execute the stationary regeneration mode as described above. In the stationary regeneration mode, however, the rotation speed is maintained at the specified rotation speed. It is not preferable to abruptly execute the stationary regeneration mode during work because a sharp fluctuation in the rotation speed is thereby caused. Therefore, the stationary standby mode for awaiting a command from an operator is created. In the stationary standby mode, the ECU 50 activates the warning device 15 to issue a stationary warning. The stationary warning is a warning for urging the operator to execute the stationary regeneration mode. Specifically, the ECU 50 lights the warning lamps. Upon reception of the stationary warning, the operator ceases the work and moves the working vehicle for installing the engine 1 thereon from the working place to another place as required. After that, the operator inputs a stationary regeneration command through the stationary regeneration button 16. Upon the input of the stationary regeneration command, the stationary regeneration mode is started.

Exhaust Gas Recirculation (EGR) can be used in the self-regeneration mode. On the other hand, the EGR is not used in the assist regeneration mode, the reset regeneration mode, and the stationary regeneration mode. In those control modes, the total injection quantity is on an increased level and amount of produced unburned hydrocarbon is also increased. That is, the EGR is not used in the control modes in order that the unburned hydrocarbon may be prevented from adhering to the EGR pipe 8.

Figure 5:
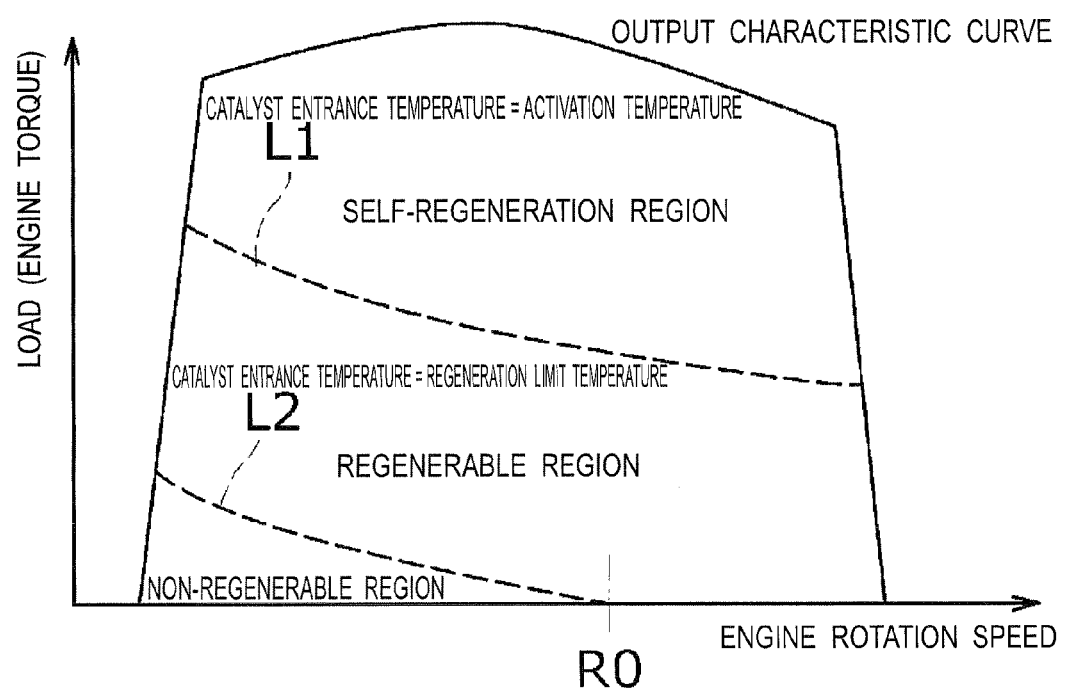
FIG. 5 is a diagram showing a self-regeneration region, a regenerable region, and a non-regenerable region.

FIG. 5 is a diagram showing a self-regeneration region, a regenerable region, and a non-regenerable region. In FIG. 5, horizontal axis designates the rotation speed of the engine 1 and vertical axis designates the load (torque). In FIG. 5, an output characteristic curve of the engine 1 is depicted and region in the output characteristic curve is divided into the self-regeneration region, the regenerable region, and the non-regenerable region. A first boundary line L1 shows boundary between the self-regeneration region and the regenerable region. A second boundary line L2 shows boundary between the regenerable region and the non-regenerable region. The first boundary line L1 represents a rotation speed-torque curve under a condition that the catalyst entrance temperature in the normal operation is equal to the activation temperature (300° C.). That is, the self-regeneration region represents a region in which the catalyst entrance temperature is equal to or higher than the activation temperature. When the rotation speed and the torque are in the self-regeneration region, the regeneration of the filter 19 is carried out without special control. That is, the self-regeneration region represents a region in which the regeneration of the filter 19 is reliably attained in the self-regeneration mode. The second boundary line L2 represents a rotation speed-torque curve under a condition that the catalyst entrance temperature in the normal operation is equal to a regeneration limit temperature. Execution of the reset regeneration mode causes an increase in the catalyst entrance temperature. When the reset regeneration mode is executed on condition that the catalyst entrance temperature in the normal operation is too low, however, the catalyst entrance temperature may fail to reach the activation temperature. The regeneration limit temperature represents lower limit of the catalyst entrance temperature that allows attainment of the activation temperature. The regenerable region represents a region in which the catalyst entrance temperature is lower than the activation temperature and equal to or higher than the regeneration limit temperature. When the rotation speed and the torque are in the regenerable region, the regeneration of the filter 19 can be attained by execution of the assist regeneration mode or the reset regeneration mode. The non-regenerable region represents a region in which the catalyst entrance temperature is lower than the regeneration limit temperature. When the rotation speed and the torque are in the non-regenerable region, the regeneration of the filter 19 cannot be attained by the execution of either the assist regeneration mode or the reset regeneration mode.

In the stationary regeneration mode, the rotation speed is maintained at the specified rotation speed R0. In FIG. 5, the non-regenerable region does not exist on condition that the rotation speed is equal to or higher than the specified rotation speed R0. In the stationary regeneration mode, therefore, the catalyst entrance temperature invariably reaches the activation temperature and the regeneration of the filter 19 is invariably carried out. The specified rotation speed R0 is determined on a basis of such an output characteristic curve as is shown in FIG. 5 and as is obtained experimentally.

Figure 6:
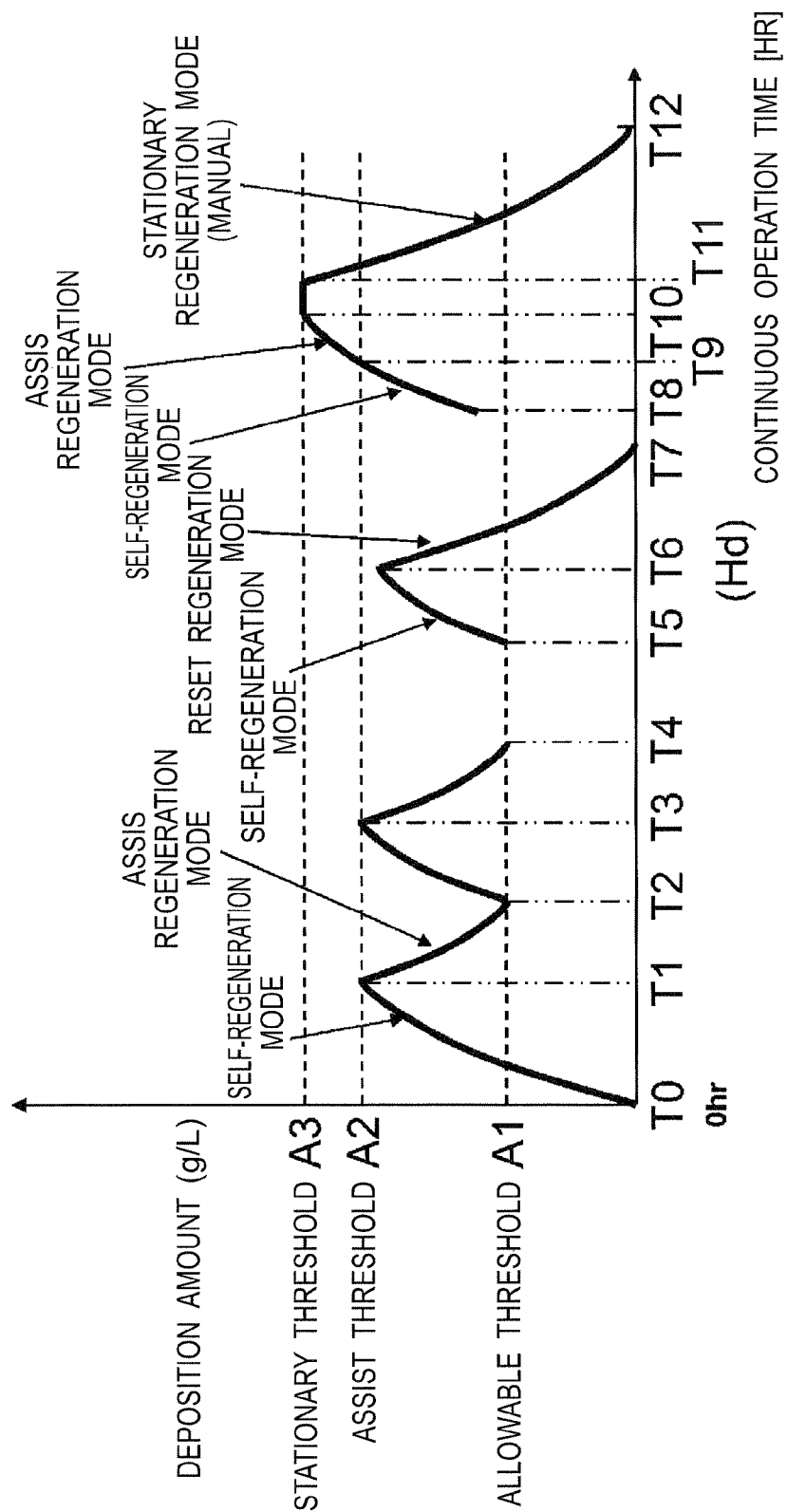
FIG. 6 is a diagram showing an example of temporal change in deposition amount.

An example of temporal change in the deposition amount in response to change of the control mode will be described with reference to FIG. 6. FIG. 6 is a diagram showing the example of the temporal change in the deposition amount. In FIG. 6, horizontal axis designates continuous operation time (hr) of the engine 1 and vertical axis designates the deposition amount (g/L). In consideration of convenience for description, temporal difference due to retardation of the control is ignored.

From time T0 to time T1, the self-regeneration mode (normal operation) is carried out and the deposition amount increases. At the time T1, the deposition amount reaches an assist threshold A2 (8 g/L) and the control mode is changed from the self-regeneration mode to the assist regeneration mode. Attainment of the deposition amount equal to or higher than the assist threshold A2 is one of the start conditions for the assist regeneration mode. From the time T1 to time T2, the deposition amount decreases based on the control in the assist regeneration mode. At the time T2, the deposition amount reaches an allowable threshold A1 (6 g/L) and the control mode is changed from the assist regeneration mode to the self-regeneration mode. Attainment of the deposition amount smaller than the allowable threshold A1 is one of the start conditions for the self-regeneration mode. From the time T2 to time T3, the self-regeneration mode is carried out and the deposition amount increases. From the time T3 to time T4, the assist regeneration mode is carried out and the deposition amount decreases. In such a manner, basically, the self-regeneration mode and the assist regeneration mode are carried out alternately and repetitively. As a result, the increase in the deposition amount is restricted.

Time T5 represents time posterior to the time T4. From the time T5 to time T6, the self-regeneration mode is carried out and the deposition amount increases. At the time T6, the continuous operation time reaches an allowable continuous time Hd (100 hours) and the control mode is changed from the self-regeneration mode to the reset regeneration mode. Attainment of the continuous operation time exceeding the allowable continuous time Hd is one of the start conditions for the reset regeneration mode. From the time T6 to time T7, the reset regeneration mode is carried out and the deposition amount greatly decreases to zero in general. Upon completion of the reset regeneration mode, the continuous operation time is reset at zero. The time T0 and the time T6 represent time at which the continuous operation time is of zero hours.

Time T8 represents time posterior to the time T7. From the time T8 to time T9, the control mode is maintained in the self-regeneration mode and the deposition amount increases. At the time T9, the deposition amount reaches the assist threshold A2 (8 g/L) and the control mode is changed from the self-regeneration mode to the assist regeneration mode. From the time T9 to the time T10, the control mode is maintained in the assist regeneration mode. Then the deposition amount increases, however, though the assist regeneration mode is carried out. Such situation occurs under a condition of low rotation speed, for instance, as described above. At the time T10, therefore, the deposition amount reaches a stationary threshold A3 (10 g/L) and the control mode is changed from the assist regeneration mode to the stationary standby mode. In the stationary standby mode, the stationary warning is issued. In response to the stationary warning, the operator determines to cease the work, for instance, for the execution of the stationary regeneration mode. At the time T11, a stationary regeneration mode command is manually inputted and the control mode is changed from the stationary standby mode to the stationary regeneration mode. From the time T11 to time T12, the stationary regeneration mode is carried out and the deposition amount greatly decreases to be smaller than the allowable threshold A1 (6 g/L).

Next, the maintenance standby mode will be described. Once the control mode has been changed to the stationary regeneration mode, the regeneration of the filter 19 is securely fulfilled, normally. However, the change to the stationary regeneration mode is done manually. Therefore, continued drive of the engine 1 without execution of the stationary regeneration mode causes the deposition amount to become excessive. Execution of the reset regeneration mode or the stationary regeneration mode under an excessive deposition amount may cause PMs on the filter 19 to undergo chain combustion. Hereinafter, this chain combustion will be referred to as rapid regeneration. Since high heat is generated from the rapid regeneration, the filter 19 may be melted or fractured by the high heat. Accordingly, the maintenance standby mode is provided as a control mode for inhibiting the regeneration of the filter 19 upon occurrence of excessive deposition.

With the deposition amount over a maintenance threshold, the control mode is changed to the maintenance standby mode. A maintenance threshold A4 (12 g/L) is a value larger than an assist threshold A2 (8 g/L) and a stationary threshold A3 (10 g/L). Like the stationary standby mode, the maintenance standby mode is provided to allow for standby for a command from the operator. In the maintenance standby mode, the ECU 50 activates the warning device 15 to issue a maintenance warning. The maintenance warning is a warning for urging the operator to execute the maintenance. Specifically, the ECU 50 lights the warning lamps. Upon reception of the maintenance warning, the operator moves the working vehicle for installing the engine 1 thereon from the working place to another place as required, stopping the drive of the engine 1.

Figure 7:
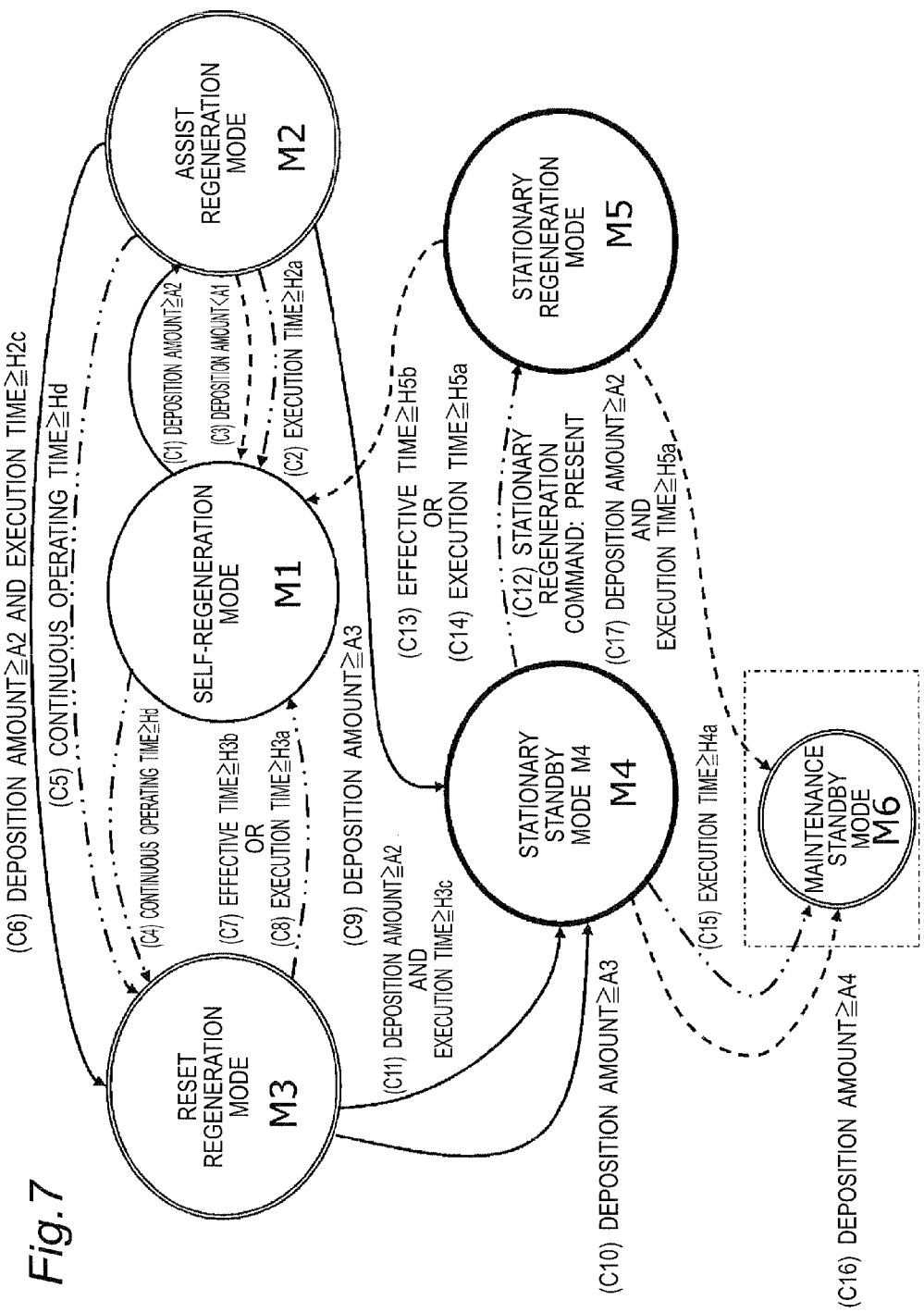
FIG. 7 is a flowchart showing transition of the control modes.

FIG. 7 is a flowchart showing transitions of the control mode. Referring to FIG. 7, the ECU 50 selects, as a control mode, any one from among self-regeneration mode M1, assist regeneration mode M2, reset regeneration mode M3, stationary standby mode M4, stationary regeneration mode M5, and maintenance standby mode M6. Each of the control modes is started upon satisfaction of specified start conditions, and ends upon satisfaction of specified end conditions, moving to another control mode. Basically, there arises a transition of control mode due to an increase or a decrease of the deposition amount.

In FIG. 7, conditions indicated by solid line and broken line include decision conditions for the deposition amount. As described before, estimation of the deposition amount is made based on the calculating estimation method and the differential pressure estimation method. Since increases in deposition amount lead to decreases in the accuracy of estimation by the differential pressure estimation method, the differential pressure estimation method is not used for cases of relatively large deposition amounts. Meanwhile, for cases of relatively small deposition amounts, both the calculating estimation method and the differential pressure estimation method are used. Solid-line arrows indicate cases where both the calculating estimation method and the differential pressure estimation method are used. Broken-line arrows indicate cases where the calculating estimation method alone is used. Also, conditions indicated by two-dot chain lines show decision conditions other than deposition amount.

When the engine 1 is started up, first, the self-regeneration mode M1 is selected as the control mode.

If condition C1 is satisfied in the self-regeneration mode M1, then the control mode is changed from the self-regeneration mode M1 to the assist regeneration mode M2. The condition C1 is "deposition amount≥assist threshold A2 (8 g/L)." If condition C2 or condition C3 is satisfied in the assist regeneration mode M2, then the control mode is changed from the assist regeneration mode M2 to the self-regeneration mode M1. The condition C2 is "execution time of assist regeneration mode M2≥specified time H2a (30 min)." The condition C3 is "deposition amount<allowable threshold A1 (6 g/L)."

If condition C4 is satisfied in the self-regeneration mode M1, then the control mode is changed from the self-regeneration mode M1 to the reset regeneration mode M3. The condition C4 is "continuous operating time≥allowable continuous time Hd (100 hr)." If condition C5 or condition C6 is satisfied in the assist regeneration mode M2, then the control mode is changed from the assist regeneration mode M2 to the reset regeneration mode M3. The condition C5 is "continuous operating time≥allowable continuous time Hd (100 hr)." The condition C6 is "deposition amount≥assist threshold A2 (8 g/L) and execution time of assist regeneration mode M2≥specified time H2c (10 min)." Also, if condition C7 or condition C8 is satisfied in the reset regeneration mode M3, then the control mode is changed from the reset regeneration mode M3 to the self-regeneration mode M1. The condition C7 is "effective time of reset regeneration mode≥specified time H3b (25 min)." The effective time of the reset regeneration mode M3 shows a time duration in which the filter entrance temperature is kept at or over the reset target temperature (600° C.) during the execution of the reset regeneration mode M3. Based on detection information by the filter entrance temperature sensor 35, the ECU 50 measures the effective time. The condition C8 is "execution time of reset regeneration mode≥specified time H3a (30 min)."

If condition C9 is satisfied in the assist regeneration mode M2, then the control mode is changed from the assist regeneration mode M2 to the stationary standby mode M4. The condition C9 is "deposition amount≥stationary threshold A3 (10 g/L)." If condition C10 or condition C11 is satisfied in the reset regeneration mode M3, then the control mode is changed from the reset regeneration mode M3 to the stationary standby mode M4. The condition C10 is "deposition amount≥stationary threshold A3 (10 g/L)." The condition C11 is "deposition amount≥assist threshold A2 (8 g/L) and execution time of assist regeneration mode≥specified time H3c (10 min)."

If condition C12 is satisfied in the stationary standby mode M4, then the control mode is changed from the stationary standby mode M4 to the stationary regeneration mode M5. The condition C12 is "stationary regeneration mode command: present," showing that the stationary regeneration command is inputted via the stationary regeneration button 16 by the operator.

If condition C13 or condition C14 is satisfied in the stationary regeneration mode M5, then the control mode is changed from the stationary regeneration mode M5 to the self-regeneration mode M1. The condition C13 is "effective time of stationary regeneration mode M5≥specified time H5b (25 min)." The effective time of the stationary regeneration mode M5 shows a time duration in which the filter entrance temperature is kept at or over the stationary target temperature (600° C.) in the stationary regeneration mode M5. The condition C14 is "execution time of stationary regeneration mode M5≥specified time H5a (30 min)." In addition, since the rotation speed is maintained at a specified rotation speed (2200 rpm) in the stationary regeneration mode M5, the condition C13 is satisfied except for cases of especially low outside air temperatures or the like.

If condition C15 or condition C16 is satisfied in the stationary standby mode M4, then the control mode is changed from the stationary standby mode M4 to the maintenance standby mode M6. The condition C15 is "execution time of stationary standby mode M4≥specified time H4a (10 hr)." The condition C16 is "deposition amount≥recovery threshold A4 (12 g/L)." Also, if condition C17 is satisfied in the stationary regeneration mode M5, then the control mode is changed from the stationary regeneration mode M5 to the maintenance standby mode M6. The condition C17 is "deposition amount≥assist threshold A2 (8 g/L) and execution time of stationary regeneration mode≥specified time H5a (30 min)."

Figure 8:
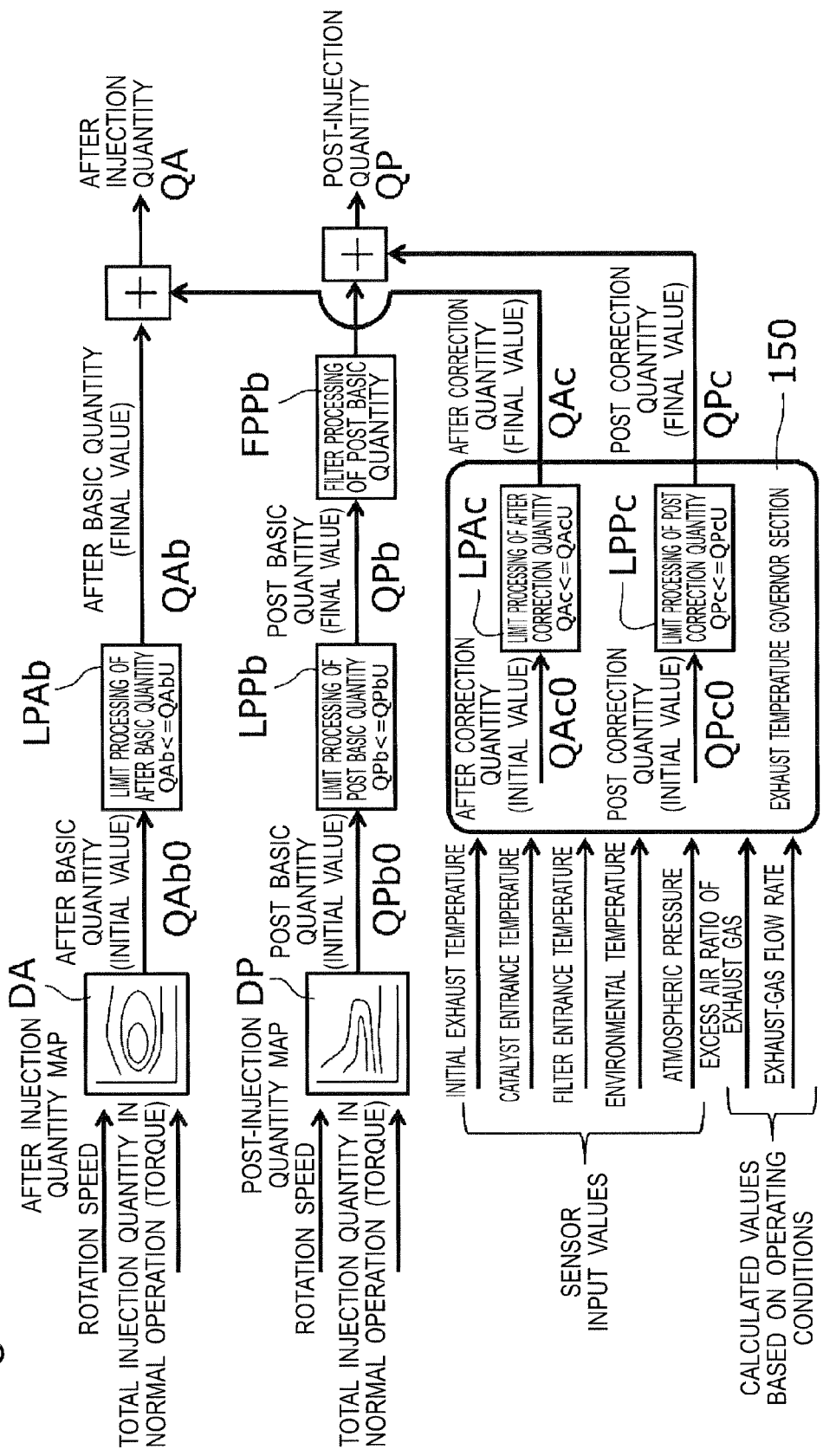
FIG. 8 is a block diagram showing a control logic for setting an after injection quantity and a post-injection quantity.
Figure 9:
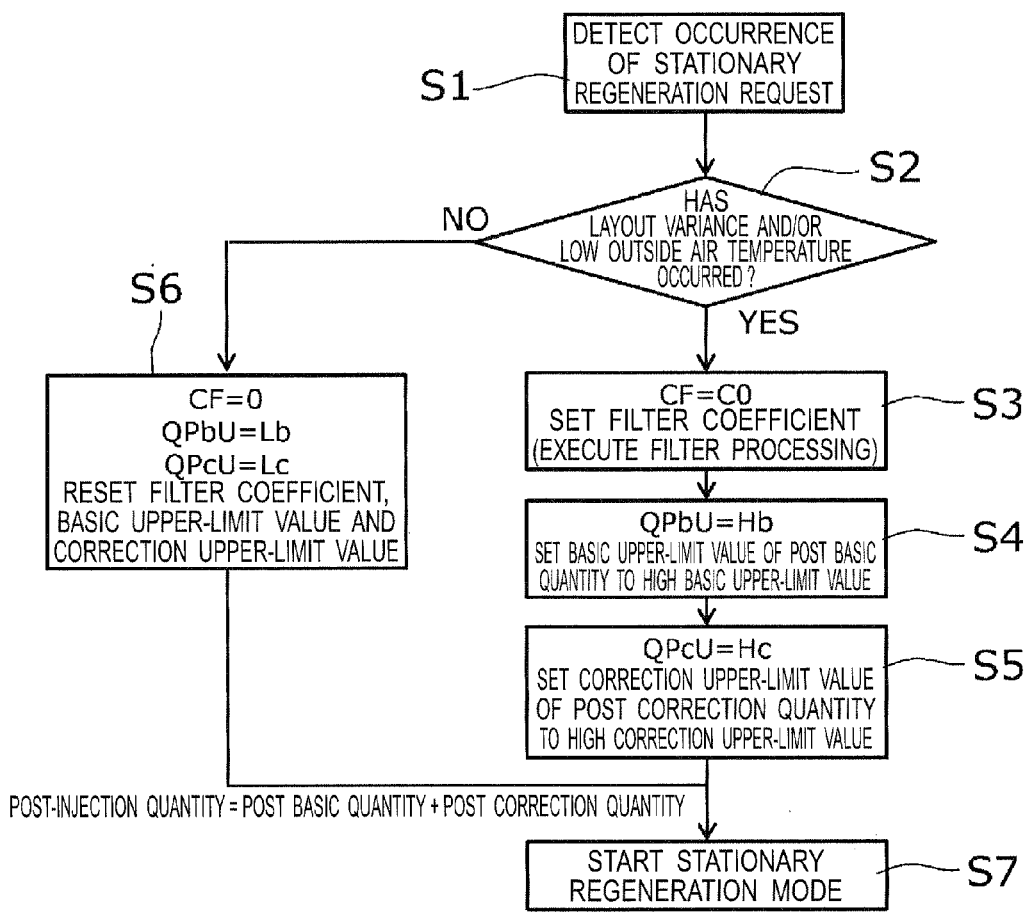
FIG. 9 is a flowchart showing a processing flow for setting a basic upper-limit value and a correction upper-limit value, as well as a filter coefficient, relating to the post-injection quantity in a stationary regeneration mode.

Referring to FIGS. 8 and 9, the setting of the after injection quantity and the post-injection quantity will be described. As described before, the after injection and/or the post-injection are executed in the assist regeneration mode, the reset regeneration mode and the stationary regeneration mode. The after injection quantity is an injection quantity of the fuel injected by the after injection, and the post-injection quantity is an injection quantity of the fuel injected by the pre-injection. The after injection quantity and the post-injection quantity are determined in the following manner.

FIG. 8 is a block diagram showing a control logic for setting an after injection quantity and a post-injection quantity. The ECU 50 sets the after injection quantity and the post-injection quantity on the basis of the control logic shown in FIG. 8. Generally, the after injection quantity QA is obtained by adding an after correction quantity QAc to an after basic quantity QAb. Similarly, the post-injection quantity QP is obtained by adding a post correction quantity QPc to a post basic quantity QPb. In this case, the ECU 50 is equipped with an exhaust temperature governor section 150 for preparing the after correction quantity QAc and the post correction quantity QPc. Also, the after injection quantity QA and the post-injection quantity QP are subject to limit processing. That is, upper-limit values are set for the after injection quantity QA and the post-injection quantity QP, respectively, in order to prevent excessive increases in initial exhaust temperature and filter entrance temperature or to prevent release of THC (Total Hydrocarbon). The upper-limit value of the after basic quantity QAb is a basic upper-limit value QAbU, and the upper-limit value of the after correction quantity QAc is a correction upper-limit value QAcU. Similarly, the upper-limit value of the post basic quantity QPb is a basic upper-limit value QPbU, and the upper-limit value of the post correction quantity QPc is a correction upper-limit value QPcU. This will be described in more detail below.

The setting of the after injection quantity will be described.

First, an initial value QAb0 of the after basic quantity is determined on the basis of a rotation speed of the engine 1 and a total injection quantity (torque) in normal operation. The total injection quantity in normal operation means a total injection quantity of the fuel under a fuel injection pattern set for the normal operation. Neither after injection nor post-injection is executed in normal operation. Therefore, the total injection quantity in normal operation equals the total injection quantity of the main injection and the pre-injection so as to be correspondent with the torque of the engine 1. The ECU 50 has stored an after injection quantity map DA, which shows correspondence relationships among the rotation speed, the total injection quantity and the after-basic-quantity initial value QAb0. On the basis of the after injection quantity map DA, an after-basic-quantity initial value QAb0 corresponding to the rotation speed and the total injection quantity in normal operation is specifically determined. Next, the after-basic-quantity initial value QAb0 is subjected to limit processing LPAb so that the after basic quantity QAb does not exceed the basic upper-limit value QAbU. If the after-basic-quantity initial value QAb0 is equal to or lower than the basic upper-limit value QAbU, then the after basic quantity QAb as a final value is set equal to the after-basic-quantity initial value QAb0. If the after-basic-quantity initial value QAb0 is larger than the basic upper-limit value QAbU, then the after basic quantity QAb as a final value is set to the basic upper-limit value QAbU.

The exhaust temperature governor section 150 prepares the after-correction-quantity initial value QAc0 on the basis of sensor input values and calculated values based on operating conditions. Various types of sensor input values include initial exhaust temperature, catalyst entrance temperature, filter entrance temperature, environmental temperature, and atmospheric pressure. The calculated values based on operating conditions include exhaust-gas excess air ratio and exhaust-gas flow rate. The ECU 50 is capable of calculating estimate values of the excess air ratio and the exhaust-gas flow rate on the basis of detected values obtained by various types of sensors 31-36 and 41-45. Next, the after-correction-quantity initial value QAc0 is subjected to limit processing LPAc so that the after correction quantity QAc does not exceed the correction upper-limit value QAcU. If the after-correction-quantity initial value QAc0 is equal to or lower than the correction upper-limit value QAcU, then the after correction quantity QAc as a final value is set equal to the after-correction-quantity initial value QAc0. If the after-correction-quantity initial value QAc0 is larger than the correction upper-limit value QAcU, then the after correction quantity QAc as a final value is set to the correction upper-limit value QAcU.

Finally, the after injection quantity QA is set to a quantity obtained by adding the after correction quantity QAc to the after basic quantity QAb.

The setting of the post-injection quantity will be described.

First, an initial value QPb0 of the post basic quantity is determined on the basis of a rotation speed of the engine 1 and a total injection quantity (torque) in normal operation. The ECU 50 has stored a post-injection quantity map DP, which shows correspondence relationships among the rotation speed, the total injection quantity and the post-basic-quantity initial value QPb0. On the basis of the post-injection quantity map DP, a post-basic-quantity initial value QPb0 corresponding to the rotation speed and the total injection quantity in normal operation is specifically determined. Next, the post-basic-quantity initial value QPb0 is subjected to limit processing LPPb so that the post basic quantity QPb does not exceed the basic upper-limit value QPbU. If the post-basic-quantity initial value QPb0 is equal to or lower than the basic upper-limit value QPbU, then the post basic quantity QPb as a final value is set equal to the post-basic-quantity initial value QPb0. If the post-basic-quantity initial value QPb0 is larger than the basic upper-limit value QPbU, then the post basic quantity QPb as a final value is set to the basic upper-limit value QPbU.

Further, the post basic quantity QPb is subjected to filter processing FPPb so that its stepwise abrupt changes become smooth.

The exhaust temperature governor section 150 prepares not only the after-correction-quantity initial value QAc0 but also the post-correction-quantity initial value QPc0 on the basis of sensor input values and calculated values based on operating conditions. Next, the post-correction-quantity initial value QPc0 is subjected to limit processing LPPc so that the post correction quantity QPc does not exceed the correction upper-limit value QPcU. If the post-correction-quantity initial value QPc0 is equal to or lower than the correction upper-limit value QPcU, then the post correction quantity QPc as a final value is set equal to the post-correction-quantity initial value QPc0. If the post-correction-quantity initial value QPc0 is larger than the correction upper-limit value QPcU, then the post correction quantity QPc as a final value is set to the correction upper-limit value QPcU.

Finally, the post-injection quantity QP is set to a quantity obtained by adding the post correction quantity QPc to the post basic quantity QPb.

Next, setting of the basic upper-limit value QPbU and the correction upper-limit value QPcU relating to the post-injection quantity will be described. The after basic quantity QAb and the after correction quantity QAc are provided in order to prevent the initial exhaust temperature from excessively increasing. The post basic quantity QPb and the post correction quantity QPc are provided in order to prevent the filter entrance temperature from excessively increasing. In this embodiment, the basic upper-limit value QPbU and the correction upper-limit value QPcU relating to the after injection quantity are set to constants, being invariable. On the other hand, the basic upper-limit value QPbU and the correction upper-limit value QPcU relating to the post-injection quantity are set variable, as will be described below.

The basic upper-limit value QPbU and the correction upper-limit value QPcU relating to the post-injection quantity are changed depending on the presence or absence of temperature lowering factors. The temperature lowering factors refer to factors that cause the initial exhaust temperature or the filter entrance temperature to lower. The setting is such that the basic upper-limit value QPbU and the correction upper-limit value QPcU become higher as the initial exhaust temperature or the filter entrance temperature decreases.

Used as the temperature lowering factors are the layout of the engine 1 and the outside air temperature. Due to variances of the engine layout, there occur variances in the length of the exhaust path 5 (path length). As the path length becomes longer, heat quantity released from the exhaust gas during passage through the exhaust path 5 increases. In this embodiment, the layout having the shortest length of the exhaust path 5 is set as the reference layout from among a plurality of possible layouts. There occurs a layout variance on condition that the path length is longer than a reference length. The reference length refers to a length of the exhaust path 5 in the reference layout. Occurrence of a layout variance is detected on the basis of later-described layout decision conditions. The layout variance (variance of engine layout) is one of factors that cause the filter entrance temperature to lower.

Also, as the outside air temperature decreases, the heat radiation quantity itself from the engine 1 increases, so that the initial exhaust temperature decreases. The outside air temperature is detected by the environmental temperature sensor 31. A low outside air temperature is also a factor that causes the initial exhaust temperature to lower.

In this embodiment, the basic upper-limit value QPbU and the correction upper-limit value QPcU are changed in two steps. In the absence of the temperature lowering factors, the basic upper-limit value QPbU and the correction upper-limit value QPcU are set to a low basic upper-limit value Lb and a low correction upper-limit value Lc, respectively. In the presence of at least one temperature lowering factor, the basic upper-limit value QPbU and the correction upper-limit value QPcU are set to a high basic upper-limit value Hb and a high correction upper-limit value Hc, respectively. The high basic upper-limit value Hb is higher than the low basic upper-limit value Lb, and the high correction upper-limit value Hc is higher than the low correction upper-limit value Lc.

In the filter processing FPPb of the post-injection quantity, a filter coefficient CF is changed depending on the presence or absence of the temperature lowering factors. In this embodiment, the filter coefficient CF is changed in two steps. In the presence of at least one temperature lowering factor, the filter coefficient CF is set to a specified value C0. The specified value is not zero. In the absence of the temperature lowering factors, the filter coefficient CF is set to 0. That is, in this case, the filter processing FPPb is substantially not executed.

Referring to FIG. 9, setting of the basic upper-limit value QPbU and the correction upper-limit value QPcU relating to the post-injection quantity, as well as setting of the filter coefficient CF, in the stationary regeneration mode will be described. These settings are necessary because the post-injection is executed in the stationary regeneration mode.

FIG. 9 is a flowchart showing a processing flow for setting the basic upper-limit value QPbU and the correction upper-limit value QPcU, as well as the filter coefficient CF, relating to the post-injection quantity in the stationary regeneration mode. Individual processes (steps) included in the flowchart of FIG. 9 are those to be executed by the ECU 50. Step S1 shows occurrence of a stationary regeneration request. Regeneration requests are set for individual regeneration modes, respectively, and the stationary regeneration request shows a regeneration request for requesting execution of the stationary regeneration mode. Similarly, there exit a regeneration request for requesting execution of the reset regeneration mode and a regeneration request for requesting execution of the stationary regeneration mode. Generally, steps S2-S6 are executed based on the occurrence of a stationary regeneration request, and the stationary regeneration mode is started at step S7.

Step S2 is executed subsequently to step S1. At step S2, it is decided whether or not a layout variance and/or low outside air temperature has occurred. That is, at step S2, it is decided whether or not a temperature lowering factor is present. If it is decided at step S2 that a layout variance and/or low outside air temperature has occurred, step S3 is executed. On the other hand, if it is decided at step S2 that a layout variance and/or low outside air temperature has not occurred, step S6 is executed.

Steps S3-S5 are executed sequentially. At step S3, the ECU 50 sets the filter coefficient CF to the specified value C0. As a result, filter processing is executed when the post basic quantity is set. At step S4, the ECU 50 sets the basic upper-limit value QPbU of the post basic quantity to the high basic upper-limit value Hb. At step S5, the ECU 50 sets the correction upper-limit value QPcU of the post correction quantity to the high correction upper-limit value Hc. By the steps S4 and S5, the upper-limit value of the post-injection quantity QP is relaxed, so that the post-injection quantity QP can be increased.

At step S6, the ECU 50 resets the filter coefficient CF, the basic upper-limit value QPbU of the post basic quantity, and the correction upper-limit value QPcU of the post correction quantity. That is, the ECU 50 sets the filter coefficient CF to 0, sets the basic upper-limit value QPbU to the low basic upper-limit value Lb, and sets the correction upper-limit value QPcU to the low correction upper-limit value Lc. Since the filter coefficient CF is set to 0, the filter processing is substantially not executed.

Step S7 is executed subsequently to step S5 or step S6. At step S7, the stationary regeneration mode is started as described above.

Next, the layout decision conditions will be described. This embodiment includes three layout decision conditions shown below. If any one of the layout decision conditions is satisfied, the ECU 50 decides that the path length of the engine 1 is longer than the reference length so that a layout variance has occurred to the engine 1. That is, the ECU 50 decides that since the path length of the engine 1 is longer than the reference length, the basic upper-limit value QPbU and the correction upper-limit value QPcU need to be changed toward the incremental side.

A first layout decision condition is set based on a temperature difference (temperature decreasing width) between the initial exhaust temperature and the filter entrance temperature. The initial exhaust temperature, which is a temperature of exhaust gas at the entrance of the exhaust path 5, is detected by the initial exhaust temperature sensor 33. The filter entrance temperature is detected by the filter entrance temperature sensor 35. The first layout decision condition is that the above-described temperature difference is larger than a first specified temperature difference.

A second layout decision condition is set based on a temperature difference (temperature decreasing width) between the initial exhaust temperature and the catalyst entrance temperature. The catalyst entrance temperature is detected by the catalyst entrance temperature sensor 34. The second layout decision condition is that the above-described temperature difference is larger than a second specified temperature difference.

A third layout decision condition is set based on a pressure difference (pressure decreasing quantity) between the initial exhaust pressure and the filter entrance pressure. The initial exhaust pressure is detected by the initial exhaust pressure sensor 43. The filter entrance pressure is detected by the filter entrance pressure sensor 40a. The third layout decision condition is that the above-described pressure difference is larger than a third specified pressure difference.

A fourth layout decision condition is set based on a pressure difference (pressure decreasing quantity) between the initial exhaust pressure and the catalyst entrance pressure. The catalyst entrance pressure is detected by the catalyst entrance pressure sensor 44. The fourth layout decision condition is that the above-described pressure difference is larger than a fourth specified pressure difference.

The exhaust gas purifying apparatus according to this embodiment has the following effects by virtue of its following configuration.

(1) The exhaust gas purifying apparatus according to this embodiment includes an oxidation catalyst 18 and a filter 19 that are placed in an exhaust path 5 of an engine 1, a fuel injection device 13 for injecting fuel in accordance with a fuel injection pattern of fuel injection including post-injection, and a control device (ECU 50) configured to be capable of setting the fuel injection pattern. An upper-limit value of post-injection quantity QP for the post-injection increases with decreasing outside air temperature and/or with elongating path length of the exhaust path 5.

In this embodiment, the post-injection quantity QP is obtained by adding the post correction quantity QPc to the post basic quantity QPb, the basic upper-limit value QPbU defines the upper limit of the post basic quantity QPb, and the correction upper-limit value QPcU defines the upper limit of the post correction quantity QPc. Therefore, the upper-limit value of the post-injection quantity QP is obtained by adding the correction upper-limit value QPcU of the post correction quantity QPc to the basic upper-limit value QPbU of the post basic quantity QPb.

In this embodiment, the upper-limit value of the post-injection quantity QP is changed in two steps between a high upper-limit value and a low upper-limit value. The high upper-limit value is composed of a high basic upper-limit value Hb of the post basic quantity QPb and a high correction upper-limit value Hc of the post correction quantity QPc. The low upper-limit value is composed of a low basic upper-limit value Lb of the post basic quantity QPb and a low correction upper-limit value Lc of the post correction quantity QPc. On condition that the outside air temperature is lower than a specified outside air temperature and/or that the path length is longer than a specified path length, the upper-limit value of the post-injection quantity QP is set to the high upper-limit value. Otherwise, the upper-limit value of the post-injection quantity QP is set to the low upper-limit value. The upper-limit value of the post-injection quantity QP may also be changed not in two steps but in multiple steps with decreasing outside air temperature and/or with elongating path length of the exhaust path 5.

With decreasing outside air temperature and/or with elongating path length of the exhaust path 5, the initial exhaust temperature and the filter entrance temperature decrease. Since the upper-limit value of the post-injection quantity QP increases in response to decreases of the initial exhaust temperature and the filter entrance temperature, the upper-limit value is less likely to inhibit increases of the filter entrance temperature. Also, since the upper-limit value of the post-injection quantity QP continues to be set, excessive temperature increases and release of THC are suppressed. Therefore, the exhaust gas purifying apparatus according to this embodiment is capable of making the filter entrance temperature reach a target temperature while suppressing excessive temperature increases and release of THC even upon extension of the exhaust path or decreases in the outside air temperature.

(2) In the exhaust gas purifying apparatus according to this embodiment, on condition that the outside air temperature is lower than a specified outside air temperature and/or that the path length is longer than a specified path length, a post-injection quantity is prepared by using filter processing so that the post-injection quantity is gradually changed.

Upon increases of the upper-limit value of the post-injection quantity, the post-injection quantity may rapidly increase. In such cases, the filter processing is executed, so that rapid changes in the post-injection quantity are suppressed. Therefore, the exhaust gas purifying apparatus according to this embodiment is capable of suppressing the release of THC due to rapid changes in the post-injection quantity.

(3) In the exhaust gas purifying apparatus according to this embodiment, the control device (ECU 50) estimates the path length on a basis of a temperature difference between the initial exhaust temperature and the filter entrance temperature or on a basis of a temperature difference between the initial exhaust temperature and the catalyst entrance temperature.

In this embodiment, depending on whether or not the temperature difference as to the filter entrance temperature is larger than the first specified temperature difference, the control device (ECU 50) decides whether or not the path length is longer than the reference length. Also, depending on whether or not the temperature difference as to the catalyst entrance temperature is larger than the second specified temperature difference, the control device (ECU 50) decides whether or not the path length is longer than the reference length. That is, on the basis of temperature difference information obtained in two steps, the path length is estimated in two steps. Instead of this, the path length may also be estimated in multiple steps on the basis of temperature difference information obtained in multiple steps.

Thus, the exhaust gas purifying apparatus according to this embodiment is capable of grasping the magnitude of the path length without directly detecting the path length of the exhaust path 5.

(4) In the exhaust gas purifying apparatus according to this embodiment, on a basis of a pressure difference between the initial exhaust pressure and the filter entrance pressure, the control device (ECU 50) decides whether or not the path length is longer than the reference length.

In this embodiment, depending on whether or not the pressure difference is larger than a third specified pressure difference, the control device (ECU 50) decides whether or not the path length is longer than the reference length. That is, the path length is estimated in two steps on the basis of pressure difference information obtained in two steps. Instead of this, the path length may also be estimated in multiple steps on the basis of pressure difference information obtained in multiple steps.

Thus, the exhaust gas purifying apparatus according to this embodiment is capable of grasping the magnitude of the path length without directly detecting the path length of the exhaust path 5.

(5) In the exhaust gas purifying apparatus according to this embodiment, on the basis of a pressure difference between the initial exhaust pressure and the catalyst entrance pressure, the control device (ECU 50) decides whether or not the path length is longer than the reference length.

Thus, the exhaust gas purifying apparatus according to this embodiment is capable of grasping the magnitude of the path length without directly detecting the path length of the exhaust path 5.

In this embodiment, the upper-limit value of the post-injection quantity is set in the stationary regeneration mode. However, the upper-limit value of the post-injection quantity may also be set in another regeneration mode in which the post-injection is executed. Further, the upper-limit value of the after injection quantity may be set like the upper-limit value of the post-injection quantity.

The engine 1 according to this embodiment has the four cylinders, the supercharger 10 and the exhaust throttle valve 6. However, the engine to which the exhaust gas purifying apparatus is applied is not limited by the number of cylinders, the presence or absence of the supercharger, or the presence or absence of the exhaust throttle valve. The exhaust gas purifying apparatus may be applied to engines having different numbers of cylinders and having neither any supercharger nor any exhaust throttle valve. Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE SIGNS LIST 1 engine
5 exhaust path
13 fuel injection device
18 oxidation catalyst
19 filter
50 ECU (control device)
33 initial exhaust temperature sensor
35 filter entrance temperature sensor
40a filter entrance pressure sensor
43 initial exhaust pressure sensor
44 catalyst entrance pressure sensor

The invention claimed is:

1. An exhaust gas purifying apparatus comprising:
an oxidation catalyst and a filter that are placed in an exhaust path of an engine;
a fuel injection device configured to inject fuel in accordance with a fuel injection pattern of fuel injection including post-injection; and
an electronic control unit configured to set the fuel injection pattern, wherein
an upper-limit value of post-injection quantity for the post-injection increases with elongating path length of the exhaust path.

2. The exhaust gas purifying apparatus as claimed in claim 1, wherein on condition that the path length is longer than a specified path length, the post-injection quantity is gradually changed by filter processing.

3. The exhaust gas purifying apparatus as claimed in claim 1, further comprising:

a filter entrance temperature sensor configured to detect a filter entrance temperature that is a temperature of exhaust gas which exists between the oxidation catalyst and the filter; and an initial exhaust temperature sensor configured to detect an initial exhaust temperature that is a temperature of the exhaust gas which exists at an entrance of the exhaust path, wherein the electronic control unit estimates the path length based on a temperature difference between the initial exhaust temperature and the filter entrance temperature.

4. The exhaust gas purifying apparatus as claimed in claim 1, further comprising:

a filter entrance pressure sensor configured to detect a filter entrance pressure that is a pressure of the exhaust gas which exists between the oxidation catalyst and the filter; and an initial exhaust pressure sensor configured to detect an initial exhaust pressure that is a pressure of the exhaust gas which exists at the entrance of the exhaust path, wherein the electronic control unit estimates the path length based on a pressure difference between the initial exhaust pressure and the filter entrance pressure.

5. The exhaust gas purifying apparatus as claimed in claim 1, further comprising:

a catalyst entrance pressure sensor configured to detect a catalyst entrance pressure that is a pressure of the exhaust gas which exists at the entrance of the oxidation catalyst; and an initial exhaust pressure sensor configured to detect an initial exhaust pressure that is a pressure of the exhaust gas which exists at the entrance of the exhaust path, wherein the electronic control unit estimates the path length based on a pressure difference between the initial exhaust pressure and the catalyst entrance pressure.

6. The exhaust gas purifying apparatus as claimed in claim 1, further comprising:

a catalyst entrance temperature sensor configured to detect a catalyst entrance temperature that is a temperature of the exhaust gas which exists at an entrance of the oxidation catalyst; and an initial exhaust temperature sensor configured to detect an initial exhaust temperature that is a temperature of the exhaust gas which exists at an entrance of the exhaust path, wherein the electronic control unit estimates the path length based on a temperature difference between the initial exhaust temperature and the catalyst entrance temperature.

* * * * *